July 29, 1930.  E. E. ALLWINE  1,771,762
AUTOMATIC COOKING APPARATUS
Filed June 13, 1929  2 Sheets-Sheet 1
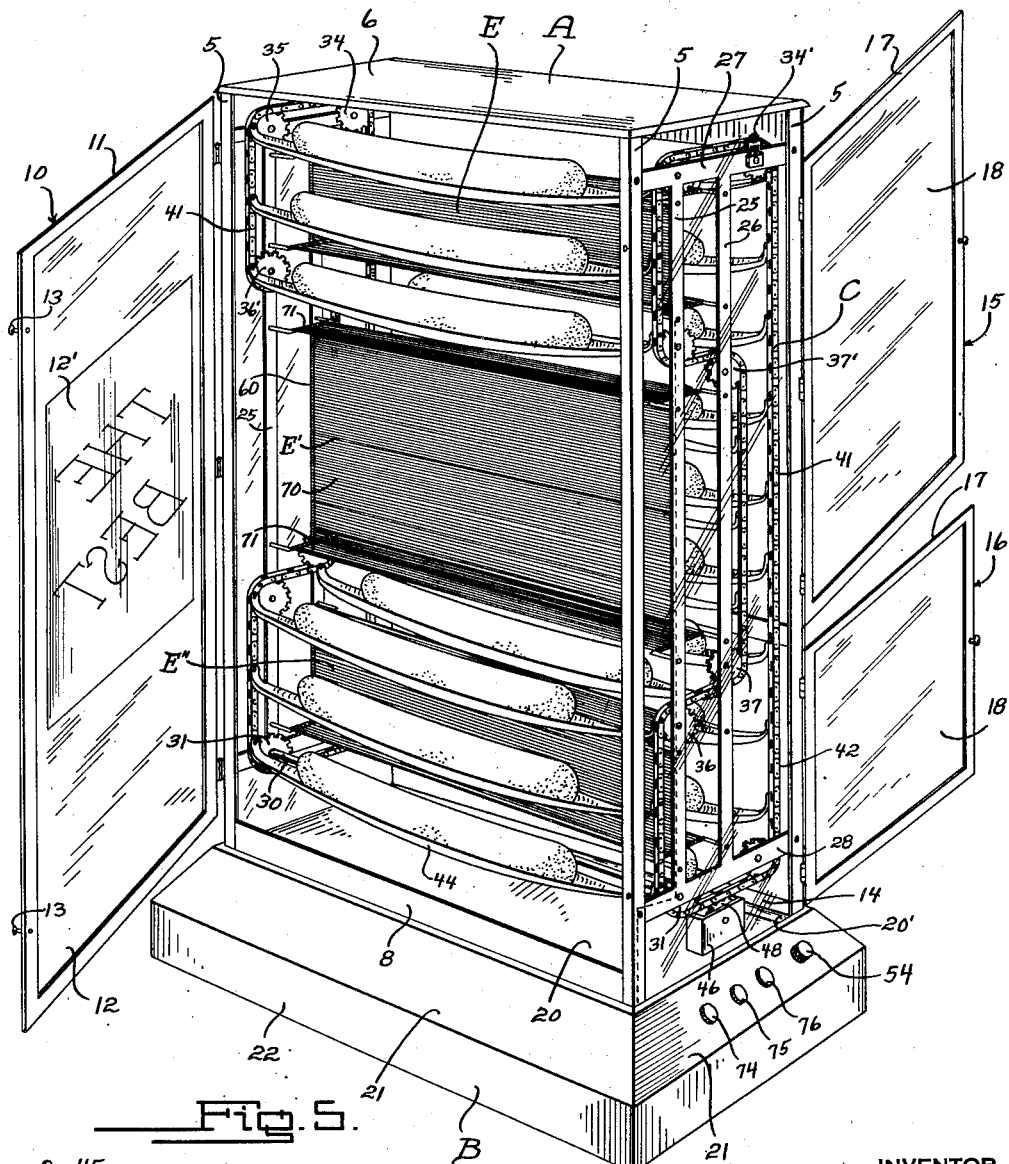
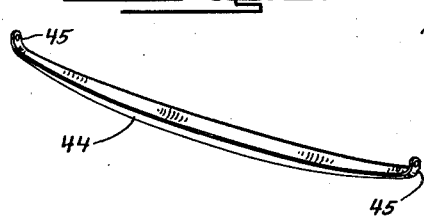
INVENTOR.
E.E. Allwine.
BY
ATTORNEYS.

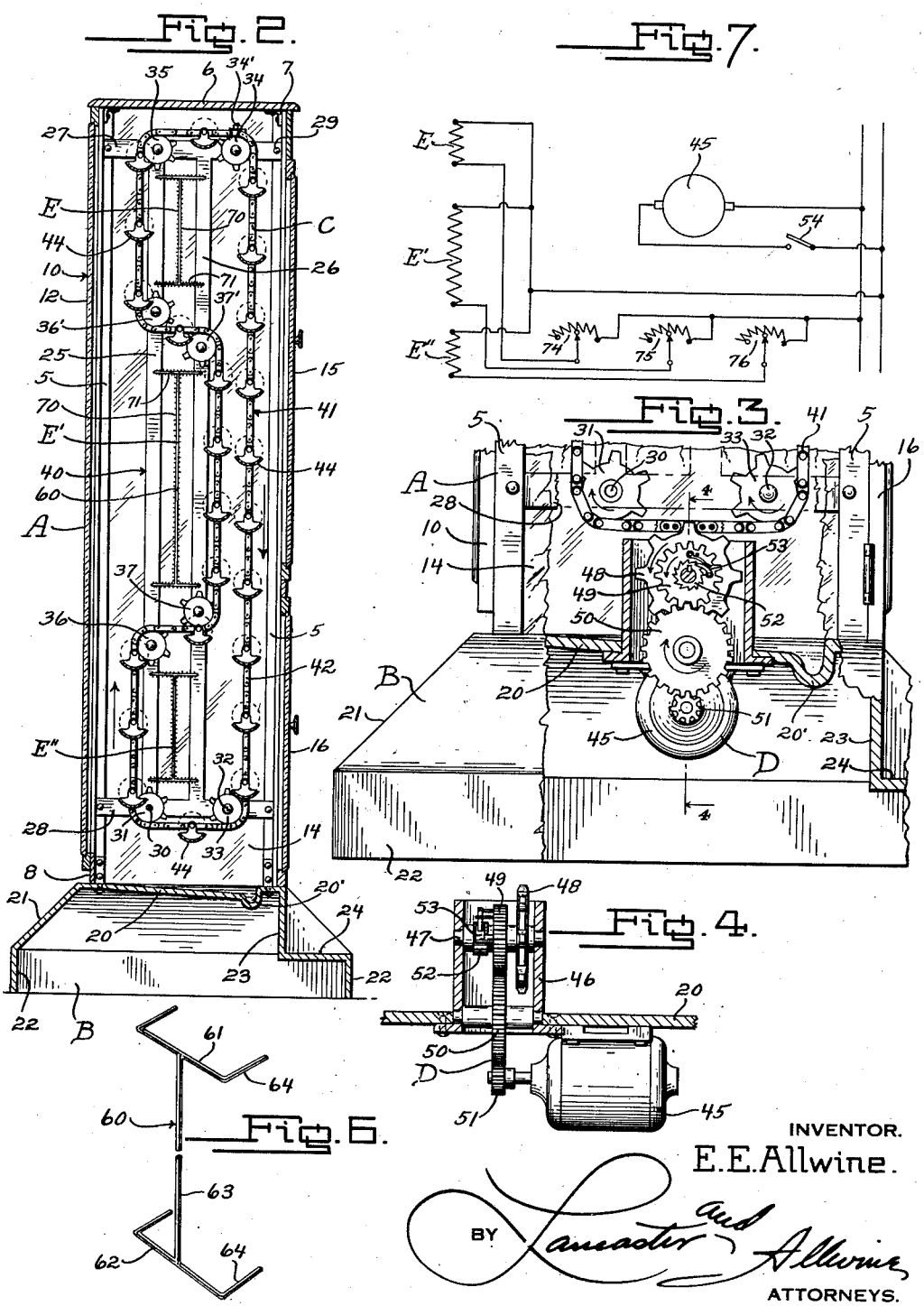

Patented July 29, 1930

1,771,762

UNITED STATES PATENT OFFICE

EUGENE ERNEST ALLWINE, OF WASHINGTON, DISTRICT OF COLUMBIA, ASSIGNOR TO I. FISCHMAN & SONS, OF PHILADELPHIA, PENNSYLVANIA, A CORPORATION

AUTOMATIC COOKING APPARATUS

Application filed June 13, 1929. Serial No. 370,719.

The present invention relates to cooking apparatus for foodstuffs and relates more particularly to apparatus of this character intended for use in automatically cooking foodstuffs for vending purposes.

The primary object of the invention is to provide in an automatic cooking apparatus, an improved construction wherein the articles of food being cooked are moved in a tortuous path of travel so as to alternately bring all parts of the food product into close proximity to the heat during the steps of complete cooking so that the food products are cooked in the manner as upon a spit without being rotated.

A further object of the invention is to provide an automatic cooking apparatus embodying an arrangement whereby the heating means may be controlled for either searing the food products being cooked during any stage of the cooking operation, or controlled for slow cooking of the food products.

A further object of the invention is to provide an improved automatic cooking apparatus embodying an arrangement whereby a supply of completely cooked products may be retained in a heated state and ready for use without being in such proximity to the heating means as to cause overcooking of the products.

A further object of the invention is to provide an automatic cooking apparatus embodying a conveyor means for moving the food products about the heating means, and which conveyor is capable of being manually operated for bringing any desired portion thereof to a given position either for removal of the cooked food products from the conveyor, or the ready placing of uncooked food products on the conveyor.

A still further object of the invention is to provide an automatic cooking apparatus having glowing heating elements between and about which the food products are moved in such manner as to allow the glow from at least one of the heating elements to serve for attractively illuminating a portion of the apparatus upon which a suitable display or advertisement may be provided.

A still further object of the invention is to provide an improved automatic cooking apparatus for cooking foodstuffs such as sausage, Frankfurters or like similar articles for vending purposes in a sanitary manner, and a cooking apparatus wherein the desired manner of cooking the food products is within ready control of the operator.

Other objects and advantages of the invention will be apparent during the course of the following detailed description, taken in connection with the accompanying drawings, forming a part of this specification, and in which drawings:

Figure 1 is a perspective view of the improved automatic cooking apparatus, the view being one looking at the front side of the apparatus and showing the closure doors swung open.

Figure 2 is a vertical section through the device and showing the manner in which the food products are moved on the endless conveyor in a tortuous path for bringing all parts of the food products in turn to the heat.

Figure 3 is an enlarged fragmentary sectional view showing the drive means for the conveyor.

Figure 4 is a fragmentary sectional view taken on the line 4—4 of Figure 3.

Figure 5 is a perspective view of one of the racks or carriers.

Figure 6 is a perspective view of one of the supporting members for the ends of the heating elements.

Figure 7 is a wiring diagram showing the manner in which the heating elements may be dependently controlled for varying the degree of heat emitted from each heating element.

Referring to the drawings in detail, and wherein similar reference characters designate corresponding parts thruout the several views, the improved cooking apparatus has been shown embodying a housing or casing A having a supporting base B, said casing serving as a closure for the conveyor means C operable by the drive means D for movement of the articles being cooked thru the radiating heat waves from the heating units E, E' and E''.

Referring first to the novel construction of the casing A, the same is preferably of substantially oblong shape having its greatest dimension in its height, and is mainly constructed from transparent panels so that the articles being cooked may be readily seen from any side of the casing, allowing prospective purchasers and also the operator to readily observe the articles of food being cooked. The casing embodies the corner uprights or standards 5 which are preferably formed of angle irons and secured at their lower ends in any suitable manner to the upper surface of the base B. The upper ends of the standards 5 are connected by a top plate or cover 6 which may be secured to the standards by angle brackets 7 shown in Figure 2. Connected between the lower ends of the two front standards of the casing is a rail 8 which is relatively shallow in height and forms a stop rail for the lower edge of the front closure door 10. The door 10 for closing substantially the entire front of the casing A is constructed with a suitable frame 11 hinged at one side rail to one of the front uprights 5. The frame 10 supports a glass panel 12 which may be provided at its central portion with a display space 12' bearing a suitable slogan or advertising matter of any kind which will be displayed to advantage in a manner subsequently explained. As will be observed in Figure 2, the cover plate 6 preferably has an overhang beneath which the upper edge of the door 10 fits when closed to exclude dirt from the casing. The swinging rail of the door may be provided with suitable fasteners 13 engageable with one front upright 5 for normally retaining the door closed.

The ends of the casing are preferably closed by end glass panels 14 which extend from the lower side of the top plate 6 to the upper surface of the base B. The rear side of the casing is preferably closed by means of upper and lower hinge doors 15 and 16 respectively, the upper door 15 being larger than the lower 16 and primarily serving as an inspection door whereby access may be had to the upper portion of the casing for cleaning purposes or inspection of the apparatus contained in the casing. The lower door 16 is relatively smaller and preferably constitutes the service door enabling the operator to readily place and remove food articles from the conveyor means. The doors 15 and 16 are each formed with suitable frames 17 in which are arranged glass panels 18 enabling the operator to observe the condition of the articles being cooked.

The supporting base B is of hollow formation providing an enclosure for the drive means D. The base B is preferably formed with an inclined top surface 20 of a dimension slightly greater than the base dimension of the casing A and upon which the uprights or standards 5 rest and are secured in any preferred manner. From the end and front edges of the flat top plate 20 the base inclines outwardly as at 21 and terminates in vertical wall portions 22. From the rear edge of the flat top plate 20 the base extends vertically as at 23 and then outwardly at a right angle to the vertical wall portion 22 providing a shelf 24 arranged directly beneath the service door 16. This shelf 24 provides a convenient place for placing the food articles when either loading the conveyor means or removing cooked food products therefrom.

The top plate 20 as will be observed slopes downwardly toward the rear of the base B, and adjacent its rear edge is formed with a gutter 20'. This sloping of the top plate 20 will allow for drippings from the food articles to gather in the trough or gutter 20' at the rear of the supporting base where the same may be readily and easily removed.

The conveyor means C includes a pair of supporting or mounting frames of open construction mounted one in each end of the casing A. These mounting frames each consist of a pair of narrow front and rear uprights 25 and 26 respectively connected at their upper ends intermediate the ends of a top cross rail 27 and at their lower rails by a bottom cross rail 28. The supporting frames are relatively flat and are mounted in the ends of the casing A to the inner sides of the standards 5 as by rivets or the like 29 passed thru the ends of the rails 27 and 28. As will be observed in Figures 1 and 2, the top cross rail 27 is slightly spaced below the cover plate 6 while the bottom cross rail 28 is spaced above the top plate 20 of the base B.

Revolubly mounted at its ends in the bottom cross rail 28 below the front upright 25 is a coupling shaft 30 having keyed thereon or otherwise fixed for rotation with the shaft a pair of feed sprockets 31 mounted on the shaft closely adjacent the confronting sides of the cross rail. Mounted inwardly of each bottom cross rail rearwardly of the rear upright 26 as upon stub shafts 32, are idler sprockets 33 which align vertically beneath idler sprockets 34 rotatably mounted upon suitable stub shafts at the inner side of each of the top cross rails 27. Rotatably mounted on the inner side of each top cross rail 27 directly above the front upright 25 are idler sprockets 35 aligning vertically with the feed sprockets 31. Rotatably mounted upon suitable stub shafts upon the inner side of each front upright 25 and spaced substantially one-quarter way of the distance between the sprockets 31 and 35 are lower "run" offset sprockets 36, while rotatably mounted upon suitable stub shafts upon the inner side of the front upright 25 at a location substantially three-quarters way between the sprockets 31 and 35 are upper "run" offset sprockets 36'. Rotatably mounted upon suitable stub shafts at the inner side of each rear upright 26 at an elevation slightly above the sprockets 36 are lower "run" return sprockets 37, while mounted upon suitable stub shafts at the inner side of each rear upright 26 at an elevation on the upright slightly below the sprockets 36' are upper "run" return sprockets 37'.

Trained over each set of sprockets mounted at the inner side of each mounting frame 40 is an endless feed or carrier chain 41.

Each of the sprockets 34 are mounted in vertically adjustable bearings 34' which permit adjustment of their respective carrier chains 41 to compensate for variation in manufacturing limits and also wear upon the chains.

As will be observed in Figures 1 and 2, and more clearly in Figure 2, from the upper end of the long vertical run 42 the chains pass forwardly over the sprockets 34 and 35 then downwardly for a short distance about the sprockets 36' where the runs of the chains are offset rearwardly over the sprockets 37' and then downwardly parallel with and in front of the run 42 about the sprockets 37 where the runs are again offset forwardly about the sprockets 36 and then downwardly about the feed sprockets 31 and rearwardly about the sprockets 32 to the lower end of the vertical run 42. The direction of travel of the chain is in the direction of the arrows shown in Figure 2, the long rear vertical run 42 moving downwardly while the run of the chain at the front of the casing will be upwardly. The sprockets 36 and 36' have been termed "run" offset sprockets since they offset the run of the chains from a vertical to a horizontal position, while the sprockets 37 and 37' have been termed "run" return sprockets since they return the horizontal runs of the chains back to offset vertical runs.

Pendently hung between the endless feed chains 41 and evenly spaced thruout the length thereof is a series of racks or carriers 44 having upturned apertured ends 45 whereby the racks may be pendently hung at their ends between the feed chains. If so desired the racks may be hung upon pins forming pivotal connection between certain links of the endless chains. These racks may vary in construction in accordance with the particular kind of food being cooked and in the example shown are of channel-like formation adapting the carriers for use in receiving elongated articles of food such as sausage, Frankfurters, corn or the like.

Referring now to the drive means D for imparting movement to the endless carrier chains, the same preferably includes an electric motor 45 mounted in the hollow base B beneath the top plate 20. Mounted also upon the plate 20 at the forward end of the motor 45 and projecting upwardly thru the plate directly beneath the lower horizontal run of one of the feed chains 41 is an open gear box 46. Fixedly mounted upon a shaft 47 mounted horizontally in the upper portion of the box 46 is a drive sprocket 48 the peripheral portion of which projects above the box and engages in the overlying horizontal run of the feed chain for imparting travel to the chain when the sprocket is rotated. Freely rotatable upon the shaft 47 at one side of the sprocket 48 is a spur gear 49 which meshes with an intermediate larger spur gear 50 journaled in the lower portion of the gear box and meshing with a pinion 51 mounted on the armature shaft of the motor 45. The gear 50 permits mounting of the motor 45 below the base plate 20 and also allows for quiet running operation. Fixed upon the shaft 47 at one side of the gear 49 is a ratchet wheel 52 engaged by a spring pressed pawl 53 mounted upon one face of the gear 49. Thus it will be seen that with the sprocket 48 and ratchet 52 fixed on the shaft 47 and the gear 49 free on the shaft, that the shaft is free to rotate in one direction without imparting movement to the gear 49. When the gear 49 is rotated in the direction of the arrow shown in Figure 3 the pawl 53 engages the ratchet wheel 52 and causes rotation of the sprocket 48 in a like direction as that of the gear 49 so that the overlying run of carrier chain is moved forwardly so that the direction of travel of the chain will be in the direction of the arrows shown in Figure 2. It may here be well to state that the coupling shaft 30 having the sprockets 31 fixedly mounted thereon causes both feed chains to move in unison when travel is imparted to one feed chain by the drive sprocket 48. When desired to impart manual movement to the carrier chains for purposes to be later set forth, downward pull on the rear vertical run 42 in the normal direction of travel of the run will be permitted thru escapement between the ratchet wheel 32 and pawl 53. The motor 45 may be controlled by means of a suitable switch 54 conveniently located at one end of the base B.

Referring now to the heating units E, E' and E" and the particular mounting arrangement of the units within the casing A, the unit E is mounted in the upper portion of the casing, the unit E' in the intermediate portion of the casing, and the unit E" in the lower portion of the casing, the three units being mounted one above the other in vertical alignment. Each of the three units is of the like general outline and each is of I-shape in end plan with the intermediate unit E' having a height equal to the combined height of the units E and E". Each unit is provided with a pair of end supporting members 60 as shown in Figure 6 and which members are either constructed entirely from an insulating material or provided with a suitable heat resisting insulating covering. The supporting members are provided with upper and lower cross arms 61 and 62 respectively connected intermediate their ends by a vertical leg 63. Each end of the cross arms 61 and 62 is provided with an attaching extension 64 for attaching the supporting members to the uprights 25 and 26 of the mounting frame 40. The members 60 serve to support a heating element which may be in the form of a resistance wire so looped between the legs 63 and cross arms 61 and 62 of companion supporting members as to form a flat vertical web portion 70 having a flat horizontal flange portion 71 at its top and bottom edges extending equally to each side of the vertical web portion. Thus the I-formation of the heating unit provides vertical and horizontal heat emitting surfaces. The heating units are preferably mounted with the vertical web 70 in a line midway between the uprights 25 and 26 as shown in Figure 2. The heating unit E as will be observed is mounted in the frame uprights between the sprockets 35 and 36', the heating unit E' is mounted in the uprights between the sprockets 37 and 37', while the lowermost heating unit E", is mounted in the uprights between the sprockets 31 and 36.

Control rheostats 74, 75 and 76 are provided for independently controlling the heating units E, E' and E" respectively and these rheostats may be conveniently mounted at one end of the base B adjacent the motor control switch 54. This independent control of the heating units allows for the degree of heat to be varied at any state of the cooking operation and allows for the products to be cooked slowly or a searing heat being applied at any stage during the complete cooking operation. It will be observed that the conveyor travels at the rear of the heating unit E' and this allows for the red glow of the unit E' to shine thru the display space 12' and produce an effective display of the advertisement or other suitable matter placed in the display space. The attractiveness of the display may be increased by operating the rheostat 75 for varying the intensity of the glow emitted from the heating unit E'.

In operation of the apparatus the racks 44 are loaded with the food products to be cooked and upon placing the apparatus in operation by closing the switch 54 and suitably regulating the rheostats 74, 75 and 76, the conveyor means will travel in the direction of the arrows shown in Figure 2 for first carrying the food products upwardly at the front of the heating unit E" then rearwardly between the units E' and E" and upwardly at the rear of the unit E' and then forwardly between the units E and E' and again upwardly at the front side of the unit E. Thus it will be seen that the upward travel of the food products is in a tortuous path thru and about the series of vertically superposed heating units. This tortuous path of travel of the food products past and thru the heating units alternately brings all parts of the food products into close proximity to the heat during the step of complete cooking so that the food products are cooked in the manner as upon a spit without being rotated. As the food articles move vertically they are subected to the heat from the vertical web portions 70 of the heating elements, and when moving horizontally between the superposed heating units are subjected both above and beneath to the heat from the horizontal flange portions 71. After passing above the uppermost heating unit E' the completely cooked products are carried downwardly on the long vertical run 42 to the service door 16. The vertical run 42 as will be observed is considerably spaced from the vertical line of heating units so that the food is retained in a heated state ready for use without being in such proximity to the heating units as to cause overcooking of the products and yet maintain the products in a heated condition ready for use. If the apparatus is fully loaded with completely cooked products, the products may be prevented from being overcooked by regulating the rheostats controlling the heating units.

The pawl and ratchet arrangement embodied in the drive means D allows the operator to manually operate the conveyor for bringing any desired portion thereof into position at the service door 16 either for removal of the cooked food products from the conveyor, the placing of uncooked food products on the conveyor, or to facilitate cleaning of the racks or carriers 44. This manual operation of the conveyor is in the normal direction of travel of the conveyor when being slowly operated by the electric motor 45, and thus allows for the operator to quickly bring the completely cooked products on the vertical run 42 to the service door 16.

The flat top plate 20 of the base B allows for ready cleaning of the apparatus and as will be observed the rail 8 and end panels 14 act as a border for the front edge and ends of the top plate for preventing any matter dropping upon the plate from working over the ends or front side of the base. The service door 16 preferably has its lower edge engaging the upper side of the top plate 20 and thus allows for any matter upon the plate to be readily removed.

By having the intermediate heating unit E' of a height equal to the combined height of the units E and E" it will be seen that each side of the article is subjected to the same amount of heat during its upward travel past the heating units.

Thus it will be apparent that an improved type of cooking apparatus for foodstuffs has been disclosed wherein the articles of food are cooked substantially in the manner as upon a spit without being rotated about a fixed point, and one wherein the manner of cooking the articles is in complete control of the operator. It will further be apparent that a novel arrangement has been disclosed whereby the completely cooked articles may be retained in a heated state and ready for use without being in such close proximity to the heat as to become overcooked.

Changes in detail may be made to the form of invention herein shown and described, without departing from the spirit of the invention or the scope of the following claims.

I claim:

1. An automatic cooking apparatus comprising in combination, a series of superposed spaced apart heating elements each embodying a vertical web portion and top and bottom horizontal flange portions, endless conveyor means embodying conveyor chains and food racks supported between the chains for vertical movement past said vertical web portions and horizontal movement between said horizontal flange portions of the heating elements, and drive means for imparting travel to the endless conveyor means.

2. An automatic cooking apparatus comprising in combination, superposed spaced apart heating elements each embodying a vertical web portion and top and bottom horizontal flange portions, endless conveyor means including feed chains and food racks supported between the chains for upward movement in a tortuous path past the vertical web portions and between the horizontal flange portions of the heating elements and having their path of downward travel spaced a greater distance from the heating elements than the general upward travel of the racks, and drive means for imparting travel to the conveyor means.

3. An automatic cooking apparatus comprising in combination, a series of superposed spaced apart upper and lower and intermediate heating elements, said heating elements each embodying a vertical web portion and top and bottom horizontal flange portions and with the height of the intermediate unit equal to the combined height of the upper and lower heating units, endless conveyor means including food racks movable vertically at the front side of the upper and lower heating units and horizontally above and below the intermediate unit for vertical movement at the rear side thereof, and means for imparting travel to the endless conveyor means whereby the food supporting racks move upwardly in a tortuous path past and thru the heating elements.

4. An automatic cooking apparatus comprising in combination, a pair of vertical supporting frames, heating units mounted in spaced relation above one another between the frames, companion sprocket wheels mounted on the frames, endless carrier chains trained over the sprockets of each frame and having horizontal travel between the heating units and vertical travel at the sides thereof, food supporting racks connected between the chains, means for causing the chains to travel in unison, and drive means embodying a drive sprocket meshing with one of said chains.

5. An automatic cooking apparatus comprising in combination, a series of superposed spaced apart heating units, independent control means for each heating unit for varying the degree of heat emitted from each unit, endless conveyor means including food supporting racks movable in a general upward direction past and between the heating units relatively close thereto and movable in a downward path spaced from the heating units, and drive means for imparting travel to the endless conveyor means.

6. An automatic cooking apparatus comprising a housing, supports mounted vertically in the housing adjacent opposite ends thereof, heating units mounted in spaced relation one above the other in said supports, companion sprocket wheels mounted in each support including sprockets mounted above the top heating unit, sprockets mounted below the lower heating unit, and sprockets mounted between the heating units, endless carrier chains trained over the sprockets, said sprockets being arranged for causing the upward travel of the chains to alternately travel at opposite sides of the superposed heating units and the downward run of the chains in a straight path spaced rearwardly of the superposed heating units, food supporting racks mounted between the chains for travel therewith, and drive means for imparting travel to the chains.

7. An automatic cooking apparatus comprising a housing, a hollow supporting base for the housing, a series of superposed spaced apart heating units mounted in the housing, conveyor means including endless carrier chains and food supporting racks connected between the chains for movement in a tortuous path vertically past and horizontally between the spaced heating units, variable control means for the heating units, and drive means for the conveyor means embodying an electric motor mounted in the hollow base and keyed reducing gearing including a drive sprocket projecting upwardly into the housing for meshing with one of said carrier chains.

8. An automatic cooking apparatus comprising a housing, a hollow supporting base for the housing, supporting frames mounted in each end of the housing, heating units of I-shape in formation mounted in spaced relation above one another on the supporting frames, an endless carrier chain trained over the sprockets of each frame with the upward run of the chains having horizontal run portions extending between the spaced heating units, a series of food supporting racks connecting the chains for travel past and between the heating units, a shaft coupling a companion pair of the sprockets for causing unitary travel of the chains, and electrically driven drive means mounted in the hollow supporting base and embodying a drive sprocket projecting upwardly into the housing for meshing with one of the carrier chains.

9. An automatic cooking apparatus comprising a housing, a hollow supporting base for the housing, a supporting frame mounted in each end of the housing each embodying vertical uprights and top and bottom cross rails, independent heating units mounted in spaced relation one above the other between said uprights, companion pairs of sprockets rotatably mounted upon each supporting frame with one of the lowermost companion pair of sprockets being connected for rotation by a coupling shaft, an endless carrier chain trained over the sprockets of each supporting frame, food racks connected between the chains for travel upwardly in a tortuous path past and between the heating units and downwardly in a straight path of travel relatively spaced from the heating units, and drive means for imparting travel to the units embodying a motor mounted in the hollow base, a hollow gear box projecting upwardly into the casing beneath a horizontal run of one of the chains, a sprocket mounted in the gear box for meshing with the overlying run of chain, and transmission means between the motor and drive sprocket.

10. An automatic cooking apparatus comprising in combination a housing, heating units mounted in superposed spaced apart relation in the housing, conveyor means embodying endless carrier chains and food supporting racks connected between the chains for movement past and between said heating units, a hollow supporting base for the housing, an electric motor mounted in the hollow base, an open gear box projecting upwardly into the casing beneath a horizontal run of one of said carrier chains, a shaft rotatable in the gear box, a sprocket fixed on the shaft and meshing with the overlying horizontal run of chain, a gear freely rotatable on the shaft, a ratchet fixed on the shaft, a pawl carried by said gear and engageable with the ratchet for imparting rotation to the shaft when the gear is rotated in one direction, and gearing between said pawl carrying gear and the electric motor, said pawl and ratchet allowing manual movement of the carrier chains in their normal direction of travel while driven by said motor.

11. An automatic cooking apparatus comprising a housing having a transparent front panel having indicia delineated on the central portion thereof, independent heating units mounted in spaced apart overlying relation in the housing forming intermediate, top and bottom heating units, said intermediate unit being disposed directly behind said indicia, means for independently controlling the heating units, endless conveyor means embodying food supporting racks movable vertically at the front side of the top and bottom units and vertically at the rear of the intermediate unit, and drive means for imparting travel to the endless conveyor means.

12. An automatic cooking apparatus comprising a housing having a transparent end panel, a closure door for the front side of the housing having a transparent panel provided with a display space, upper and lower doors closing the rear side of the housing and providing inspection and service doors respectively each having a transparent panel, a supporting base for the housing, heating units mounted in spaced apart overlying relation in the housing, endless conveyor means in the housing embodying food supporting racks movable in a tortuous path between and upwardly past the heating units, and drive means in the supporting base and operable for imparting travel to the endless conveyor means.

E. ERNEST ALLWINE.